Sept. 1, 1925.  
E. W. BROCKMEYER ET AL  
1,551,794  
ELECTRICAL APPARATUS  
Filed May 13, 1922    3 Sheets-Sheet 1
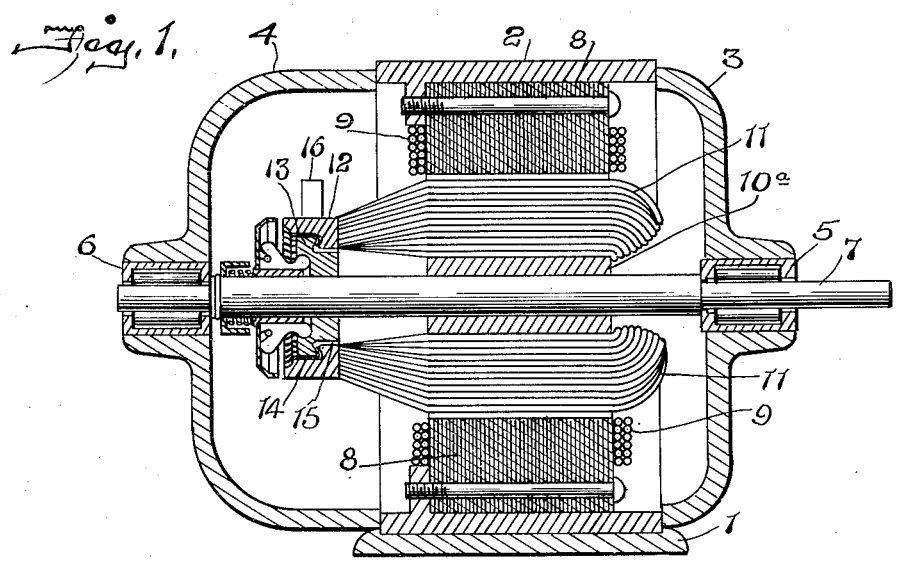
Inventors  
Edgar W. Brockmeyer,  
Steffen A. Brown,  
By Toulmin & Toulmin  
Attorneys

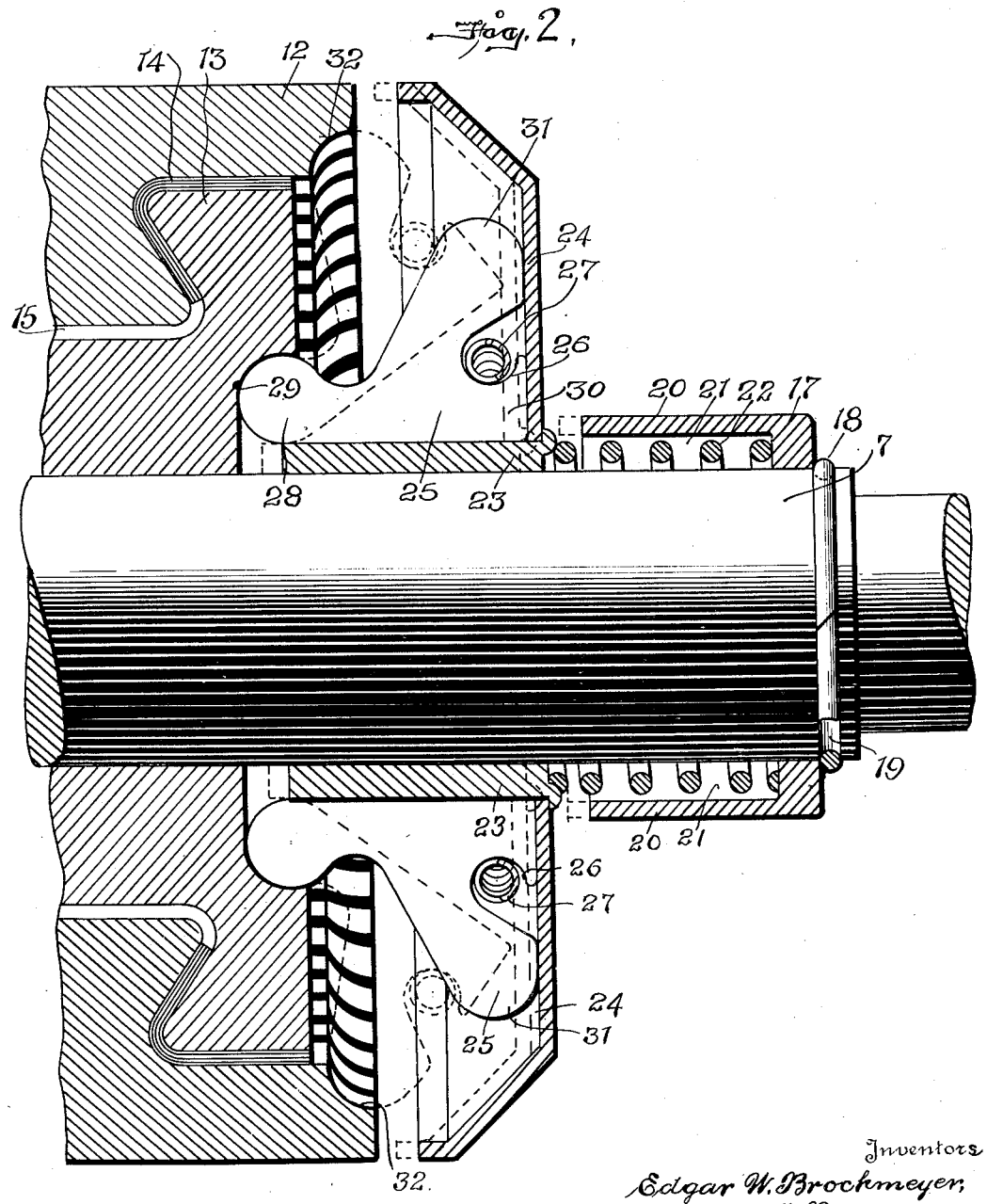

Sept. 1, 1925.  
E. W. BROCKMEYER ET AL  
1,551,794  
ELECTRICAL APPARATUS  
Filed May 13, 1922  3 Sheets-Sheet 3
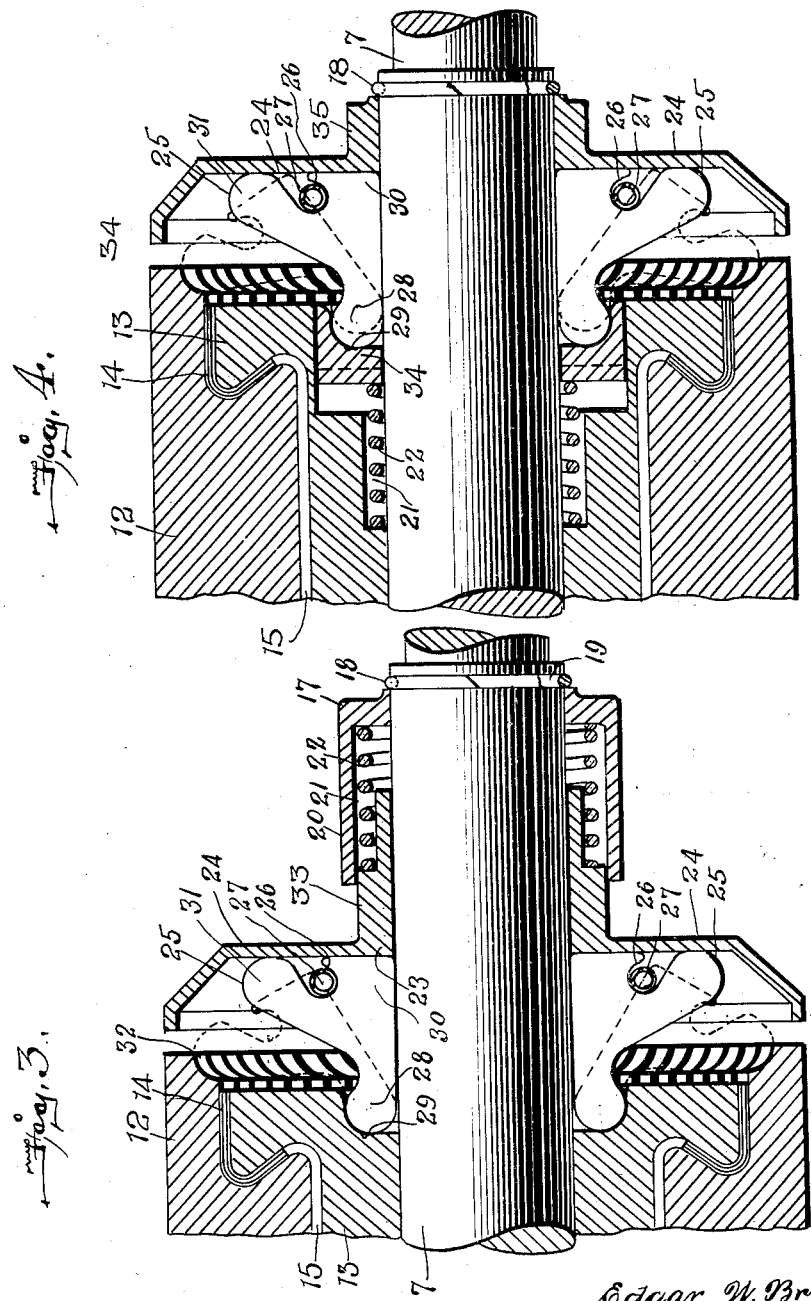
Inventors  
Edgar W. Brockmeyer  
Seessen A. Brown,  
By Toulmin & Toulmin  
Attorneys Patented Sept. 1, 1925.

1,551,794

UNITED STATES PATENT OFFICE.

EDGAR W. BROCKMEYER AND STEFFEN A. BROWN, OF DAYTON, OHIO.

ELECTRICAL APPARATUS.

Application filed May 13, 1922. Serial No. 560,575.

*To all whom it may concern:*

Be it known that we, EDGAR W. BROCKMEYER and STEFFEN A. BROWN, citizens of the United States, residing at Dayton, in the county of Montgomery and State of Ohio, have invented certain new and useful Improvements in Electrical Apparatus, of which the following is a specification, reference being had therein to the accompanying drawing.

Our invention relates to electrical apparatus and in particular to electrical motors.

It is an object of our invention to provide an electrical motor which, upon starting, will have a high starting torque that upon a given speed will be converted into an efficient running motor under full load.

It is an object of our invention to provide a motor which will carry the initial load and then upon achieving a predetermined speed bring the remainder of the mechanism into play for efficient normal running operation.

In particular, it is an object of our invention to provide a plurality of contact members to make the connection between the windings and the commutator bars upon a predetermined speed being obtained by the armature of the motor. It is a further object in this connection to provide means of positively holding such contact members out of engagement with the commutator bars until such speed is obtained and then suddenly and forcefully making a quick engagement with the commutator bars so that there will be no possibility of delayed action on the part of any one of the contact members or the possibility of any arcing, leakage, etc. It is our object to provide a single means for maintaining said contact elements in their inoperative position and to also maintain said contact elements in their operative position as soon as those elements pass a predetermined position as they are moved outwardly by the centrifugal force imparted to them due to their rotation. It is our object to provide, therefore, a single yielding member which will not only maintain the contact elements in these two positions in co-operation with other parts of the mechanism but will furnish a powerful force for positively and quickly engaging the contact members with the commutator bars when the contact members pass a predetermined point in their movement through the action of centrifugal force upon them.

Referring to the drawings:

Fig. 1 is a side elevation of our motor in section. We have shown in this connection a four pole motor but it will be understood that any number of poles may be employed.

Fig. 2 is a section of the cut-in and cut-out mechanism for bringing the remainder of the windings and commutator bars in circuit upon the armature shaft achieving a predetermined speed;

Fig. 3 is a modified form of the mechanism;

Fig. 4 is another modification of the mechanism.

Referring to the drawings in detail, 1 is a base of the motor upon which is mounted the central portion of the stator 2 and the end members 3 and 4 which serve as supports for the bearings 5 and 6 which in turn support the armature shaft 7 of the rotor.

In the form shown, four poles are employed.

Each of these poles consist of the usual laminations 8 and coil 9 suitably connected to a source of supply of current.

The rotor is composed of the armature shaft 7, a plurality of laminations 10ª in the slots of which are wound in the customary manner the windings 11 which are connected to the respective segments 12 of the commutator. These segments may be insulated from one another in any well known way.

The segments 12 are supported upon a steel shell 13 and are separated therefrom by insulation such as a mica insulation at 14 and a suitable spacing such as 15.

Brushes 16 are provided for engagement with the commutator. The wiring is such as to provide the usual type of commutated drum winding with brushes arranged to give repulsion motor starting characteristics.

It will be understood that any conventional form of wiring or construction of the motor may be employed in connection with our invention.

Referring to Fig. 2 in detail there will be seen mounted on the armature shaft 7 a collar 17 which fits upon 7 and is prevented from moving in one direction by the ring 18 fitting in a groove 19 in the armature shaft 7. This collar is extended to form a cup-shaped body as at 20, the walls of which are spaced from the armature shaft. In this space 21 is located a strong helical spring surrounding the armature shaft 7. This spring is designated 22. One end of this spring engages with 17 and the other end engages with a sliding collar 23 mounted upon 7. This collar carries a flange which is cup-shaped as at 24. This member 24 has a flat portion and an angular portion. The flat portion 24 forms a right angle to 23. A plurality of segments 25 are provided which rest between 13 and 12 and 23 and 24. A cutaway portion 26 is provided in the outer ends of these segments or fingers in which is mounted a helical spring 27 which engages the several fingers and holds them normally when at rest or up to a predetermined speed against the collar 23. The spring 22 holds 23 and 24 as a unit against the ends of these members 25. A nearly circular cam-shaped member 28 is provided on the finger 25 which forms a pivotal bearing about which 25 moves in engagement with 13 in a semi-circular cutaway portion in 13 at 29.

It will be observed that when the parts are at rest or are in the position shown in Fig. 2 in full lines up to the point where the members 25 are moved that the right angled shoulder or corner at 30 will fill the right angle between 24 and 23 and that the spring 22 will hold the members 25 positively in position due to this engagement between the right angle shoulder and the right angle wall formed by 24 and 23. The spring 27 will also serve to maintain this relationship. These members 25 are provided with contact portions or fingers 31 to engage with the commutator bars 12 in the semi-circular cutaway portions thereof at 32.

Until the rotor achieves a predetermined speed the resistance of 22 and 27 to the outward movement of 25 due to the centrifugal force being exerted on 25 will be sufficient to hold the several parts 25 in the position shown in full lines in Fig. 2 but as soon as that rate of speed is exceeded this resistance will be overcome and the portions 25 will move outwardly to the final position shown in dotted lines where they will engage with the commutator bars as at 32 thus completing the circuits in the windings in the armature and putting the motor in condition for normal operation as distinguished from the condition of starting where only a few of the windings are employed for that purpose. It is essential that this relationship be made quickly, positively and forcefully and to this end it will be observed that the spring 22 while serving to hold 25 in the position shown in full lines in Fig. 2 will, upon 25 moving out and beyond a predetermined position, forcefully move 25 into engagement with the commutator bars 12 so that 22 has a dual function of holding 25 in either one of the two positive positions of inoperativeness or operativeness and thus through a single agency we are able to secure this positive, forceful engagement of 25 with 12.

In case there is a variation in load on the motor, unless there is a positive means of this character to maintain the contact between 25 and 12, there will be a fluctuation of 25 back and forth, making and breaking the contact which is very undersirable, leading to loss in power, waste of current, arcing and the like.

It is the essence of our invention that there should be a plurality of positive contacts made forcefully. It is also a feature of our invention that due to the right angle or substantially right angle shoulder provided on 25 in engagement with 24 and 23, 25 will be held in inoperative position to the last moment before which the movement of 25 to operative position will take place.

In Fig. 3 a modification is provided in structure. The collar 23 is removed and a collar extending in the opposite direction is provided at 33.

In Fig. 4 the spring 22 is placed internally of 13 and a collar 34 is provided. It will be noted that 24 directly engages through a collar 35 with the ring 18.

It will also be noted in this form the portion 28 of 25 moves laterally along the line parallel to the axis of the armature shaft.

Upon the application of the current to the field winding an induced current is set up in such coils of the rotor as are short-circuited by the brushes 16 causing a rotating movement of the armature, whereupon other windings on the rotor will be brought into the proper relationship to the field winding and the operation will take place again thus starting the rotor and gradually increasing its speed until at a predetermined point the segments 25 are moved by centrifugal force over the predetermined position and brought positively in engagement with the commutator segments by the spring 22 and held there thus bringing into operation all of the windings on the rotor thereby causing the motor to change its characteristics from those of a repulsion type motor to those of a squirrel-cage induction type.

While we have shown and described certain features as constituting our invention, it will be understood that parts have been shown for purposes of illustration only, and that we do not desire to be limited to such details, as obvious modifications will occur to persons skilled in the art.

Having thus fully described our invention, what we claim as new and desire to secure by Letters Patent, is:—

In a device of the character described, an armature, a rotatable shaft therefor, a commutator, pivoted contact making members rotatable with the shaft and normally out of contact making position, but operable by centrifugal force to move toward contact making position, means to constantly but yieldingly hold the members in their non-contacting position, and means movable independent of the first mentioned means for moving the contact members into contacting position, said last mentioned means also arranged to aid in holding the contacting members out of contacting position.

In testimony whereof we affix our signatures.

EDGAR W. BROCKMEYER.
STEFFEN A. BROWN.